Feb. 28, 1939.　　　L. M. POTTS　　　2,148,500
METER READING RECORDER
Filed Oct. 4, 1934　　　10 Sheets-Sheet 2
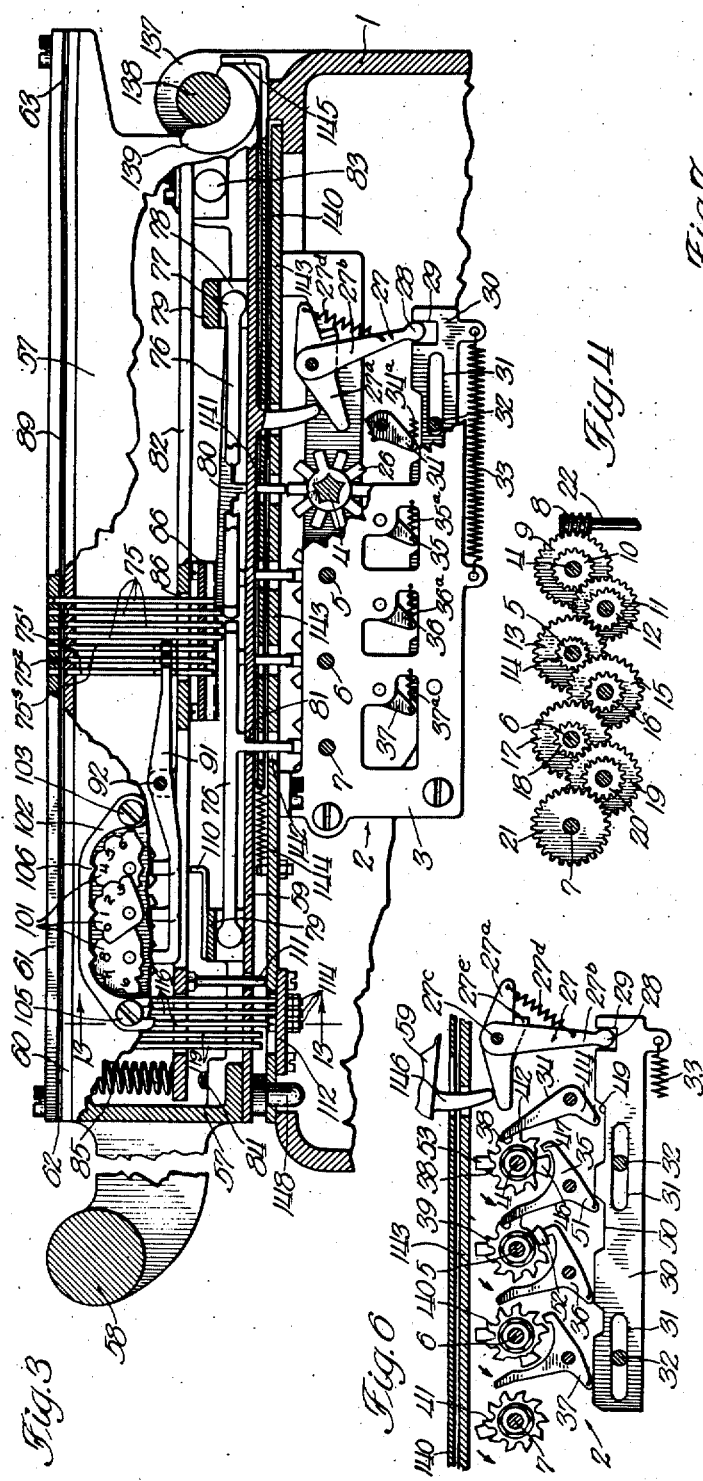
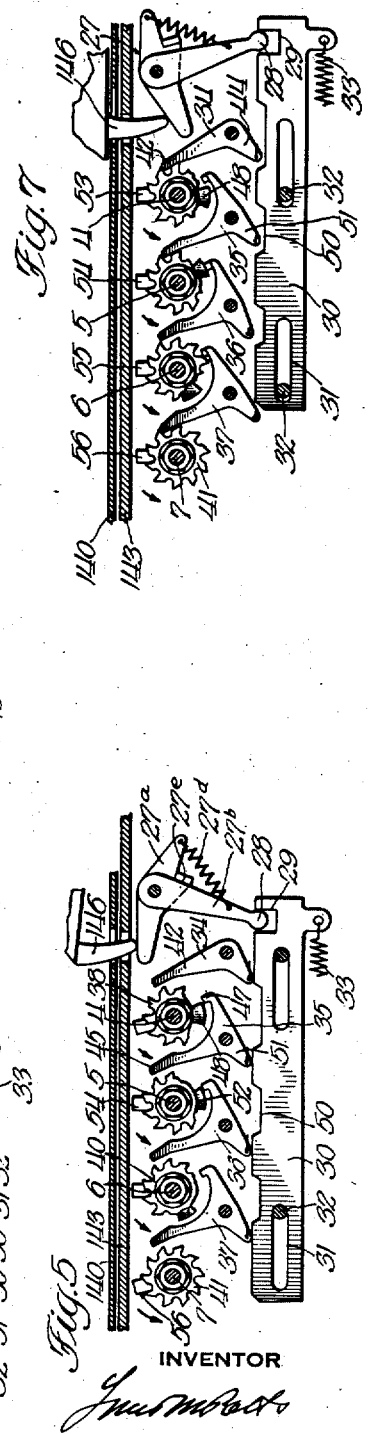
INVENTOR

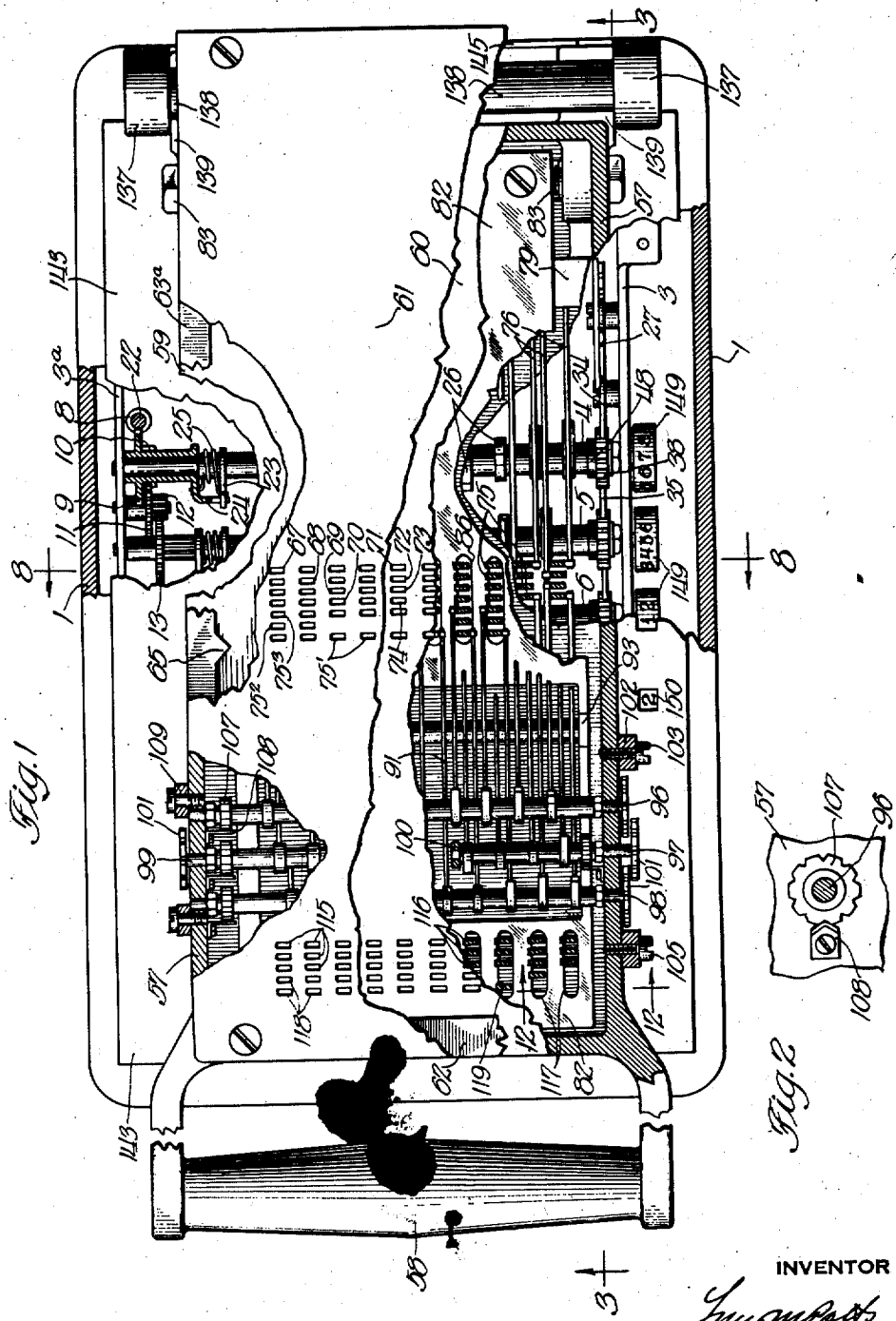

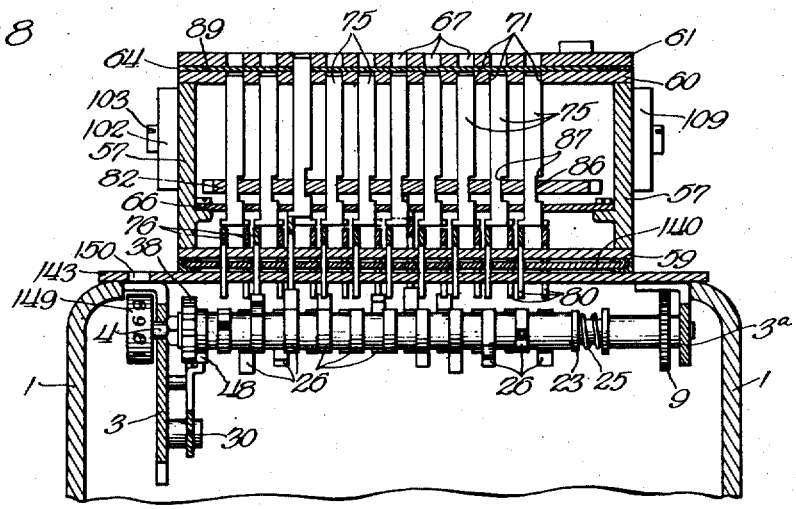
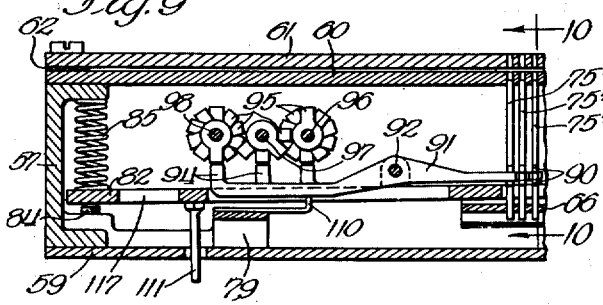
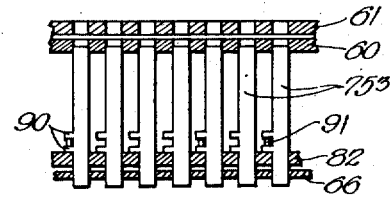
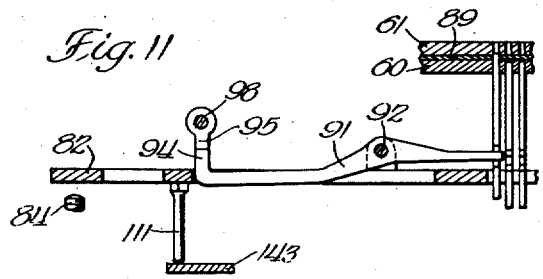
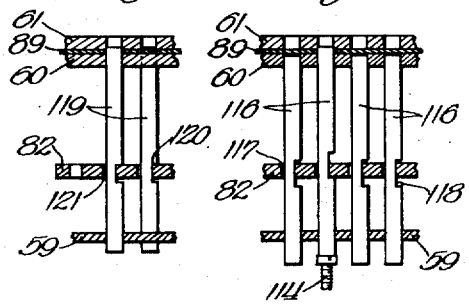
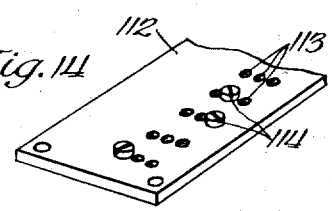

Feb. 28, 1939. L. M. POTTS 2,148,500
METER READING RECORDER
Filed Oct. 4, 1934   10 Sheets-Sheet 4

INVENTOR

Feb. 28, 1939.　　　　L. M. POTTS　　　2,148,500
METER READING RECORDER
Filed Oct. 4, 1934　　10 Sheets-Sheet 5

INVENTOR

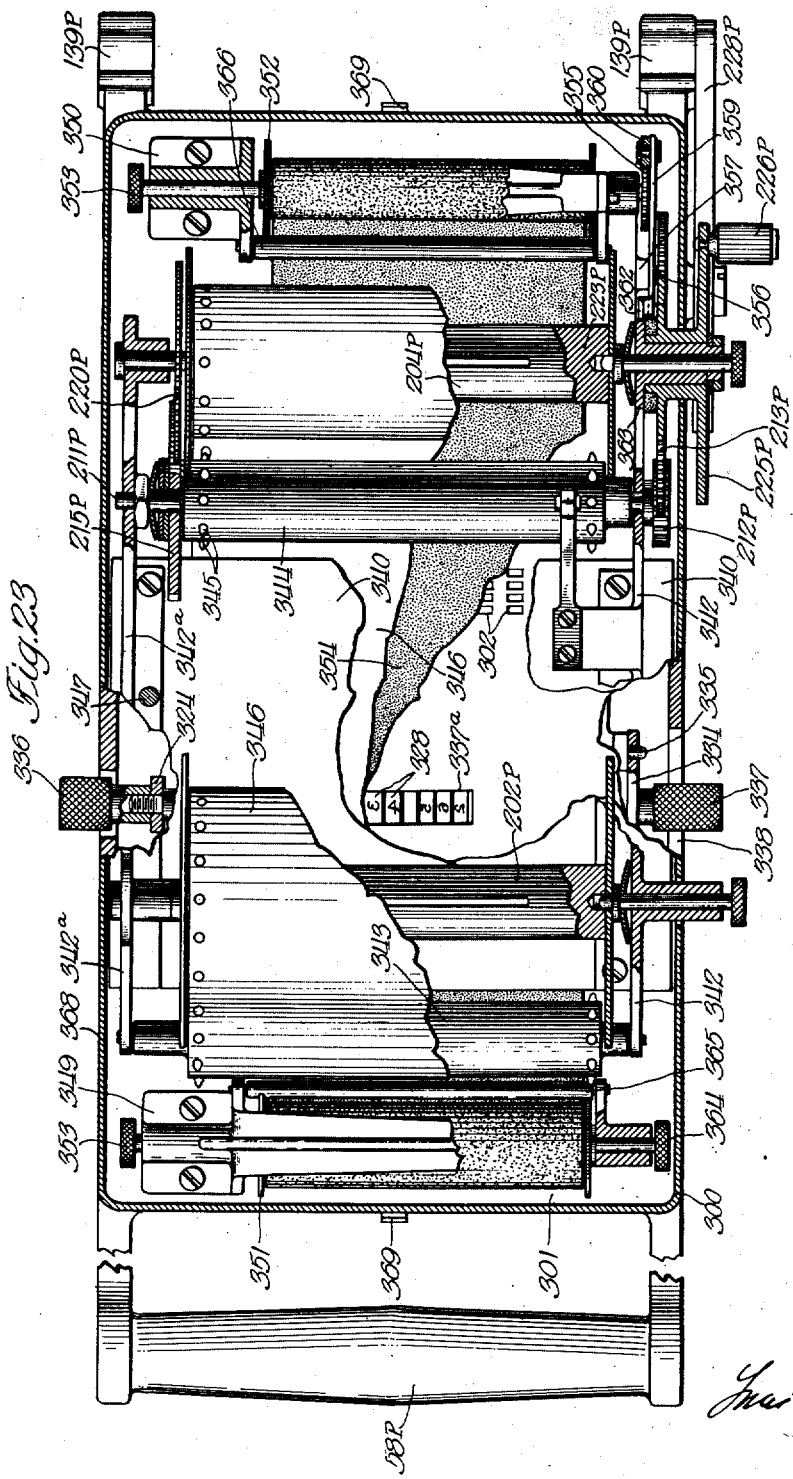

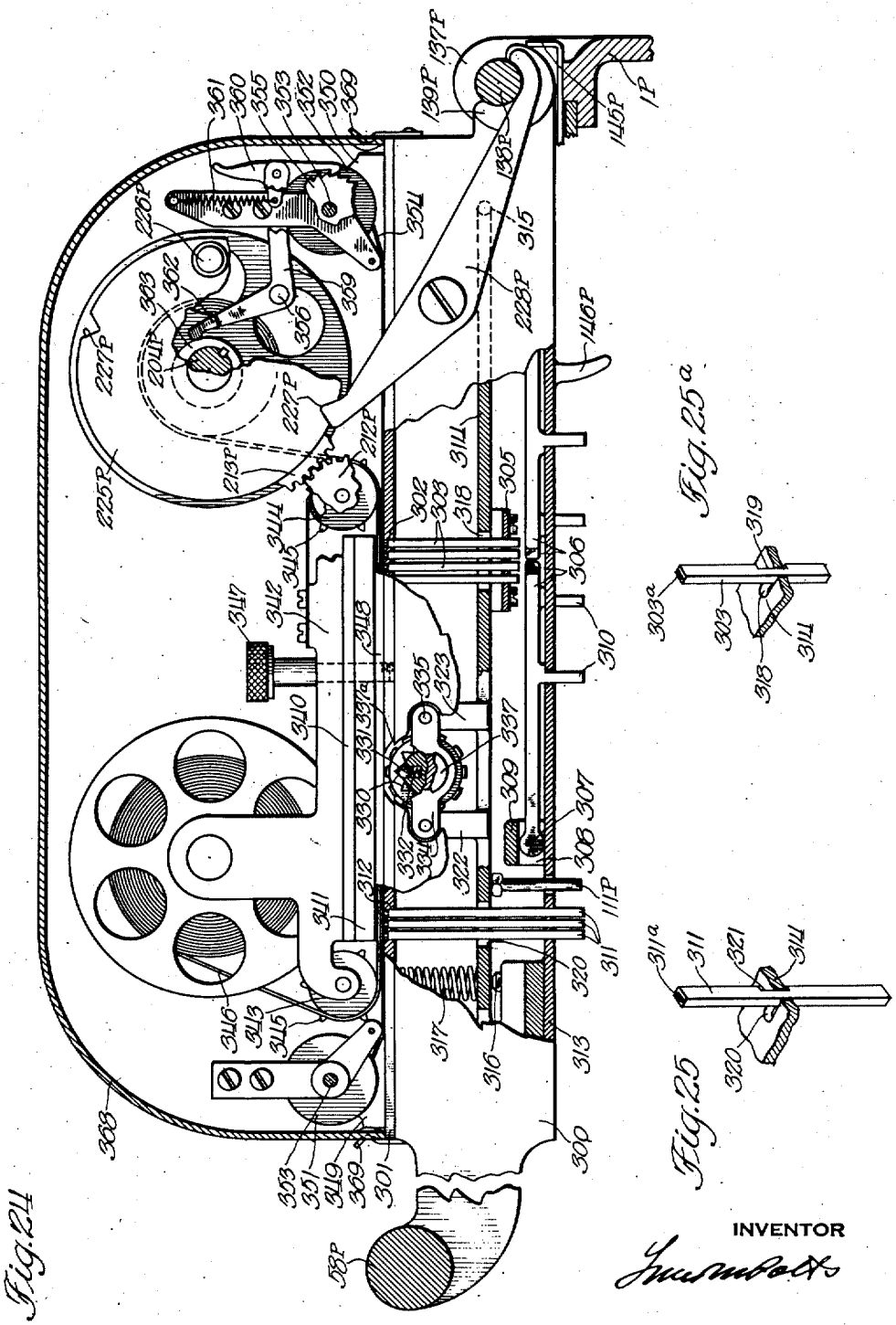

Feb. 28, 1939.   L. M. POTTS   2,148,500
METER READING RECORDER
Filed Oct. 4, 1934   10 Sheets-Sheet 10

INVENTOR

Patented Feb. 28, 1939

2,148,500

UNITED STATES PATENT OFFICE 2,148,500

METER READING RECORDER

Louis M. Potts, Evanston, Ill.

Application October 4, 1934, Serial No. 746,773

83 Claims. (Cl. 234—58)

This invention relates to methods and apparatus for reading meters used for measuring commodities, for example gas, water, or electricity.

It is a general object of this invention to provide automatic methods of taking the periodic records from meters required for billing purposes, and thus increase the accuracy of the records and reduce the cost of the billing operations.

It is a further object to make the records under the direct control of the indicating elements in the meter.

A further object is to make such a record in a form suitable for automatically controlling accounting and billing machines such as the well known machines controlled by cards having perforations corresponding to the fundamental data.

Another object of the invention is to provide a small unitary device which may be conveniently carried by the inspector and quickly associated with any meter to be read and, by a single simple operation, quickly and automatically make a perforated, printed, or other form of record of the meter reading.

A further object is to make in the same operation other records, which identify the meter, identify the recording unit used, identify the number of the meter being read, give the date of the record, or make any other suitable records.

Another object is to provide such a device, in which the records may be made in different locations on the card, so that they will have a different controlling effect on the accounting machine.

A further object is to arrange the device so that two separate records may be made at the same time and in which the same control elements control the perforations made in different locations on the two cards.

A further object is to provide in a metering device a correcting mechanism to be operated whenever a reading is to be made and which brings the indicating elements of the meter to exact integer positions.

Another object is to automatically operate the correcting device when a reading is to be made.

Another object is to also provide machines which may use continuous rolls of record material in place of separate cards for each record, and also means for making the record in typeprinted form.

An additional object is to provide locating means for the recorder on the meter, and other locating means for the recording material in the recorder.

Another object is to provide safety devices in the recorder so that the record can be made only when the record material is correctly located, and so that the record material cannot be moved while a record is being made.

All of the above objects and others will be more fully pointed out in the specification and claims which follow.

An understanding of specific ways of carrying out the invention may be had from the following description and the accompanying drawings wherein:

Figure 1 is a top view of the card perforator reader with certain parts broken away.

Figure 2 is a detail of the date and number shaft detent.

Figure 3 is a vertical section taken on the line 3—3 of Figure 1, and also shows some of the parts of the meter integrating unit.

Figure 4 shows the gears in the integrating unit of the meter.

Figures 5, 6, and 7 show the indicator correcting mechanism in different operating positions.

Figure 8 is a transverse section of the reader and part of the meter on the line 8—8 of Figure 1.

Figures 9 and 11 show certain parts of the dating mechanism in different positions.

Figure 10 shows some of the date perforating pins on a line 10—10 of Figure 9.

Figure 12 shows the meter reader number perforating pins on a line 12—12 of Figure 1.

Figure 13 shows some of the meter indicator perforating pins on a line 13—13 of Figure 3.

Figure 14 is a detail of the meter number plate.

Figure 15:
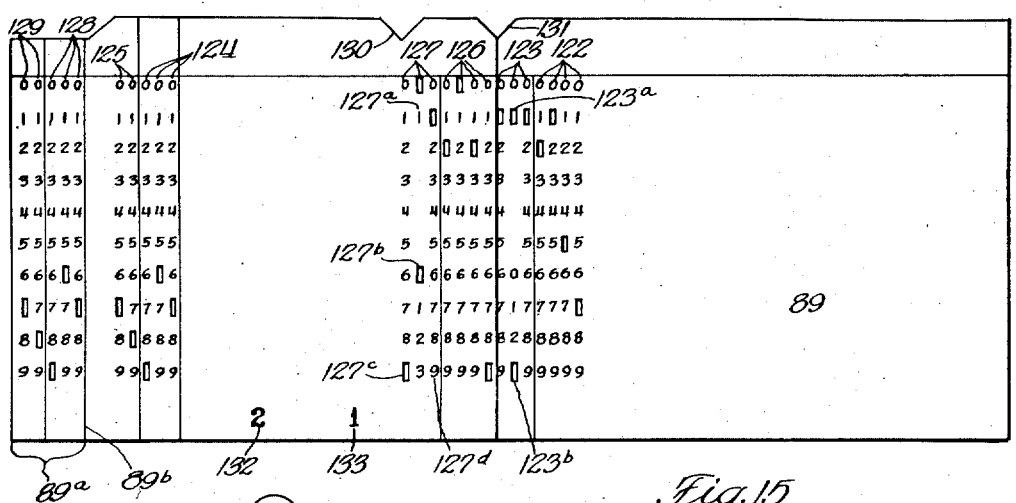

Figure 15 shows a card perforated by the reader shown in Figures 1 to 14.

Figure 16:
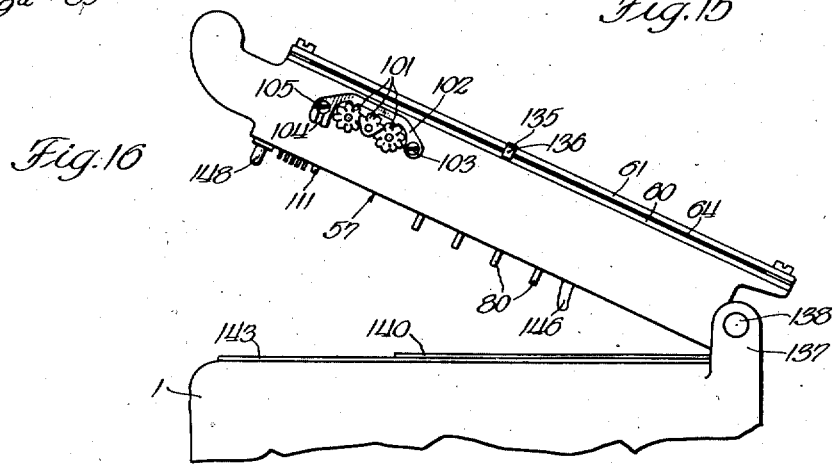

Figure 16 shows how the reader is attached to the meter to take a reading.

Figure 17:
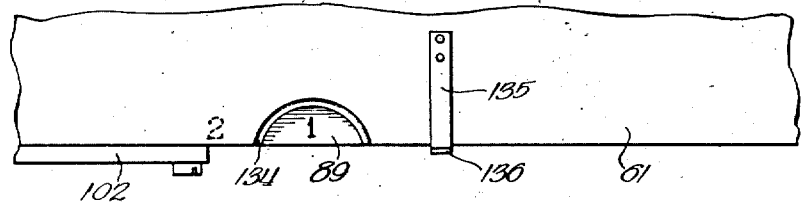
Figure 18:
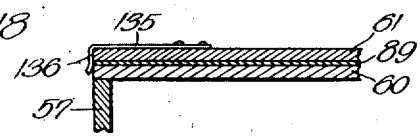

Figures 17 and 18 show details of how a card is inserted.

Figure 19:
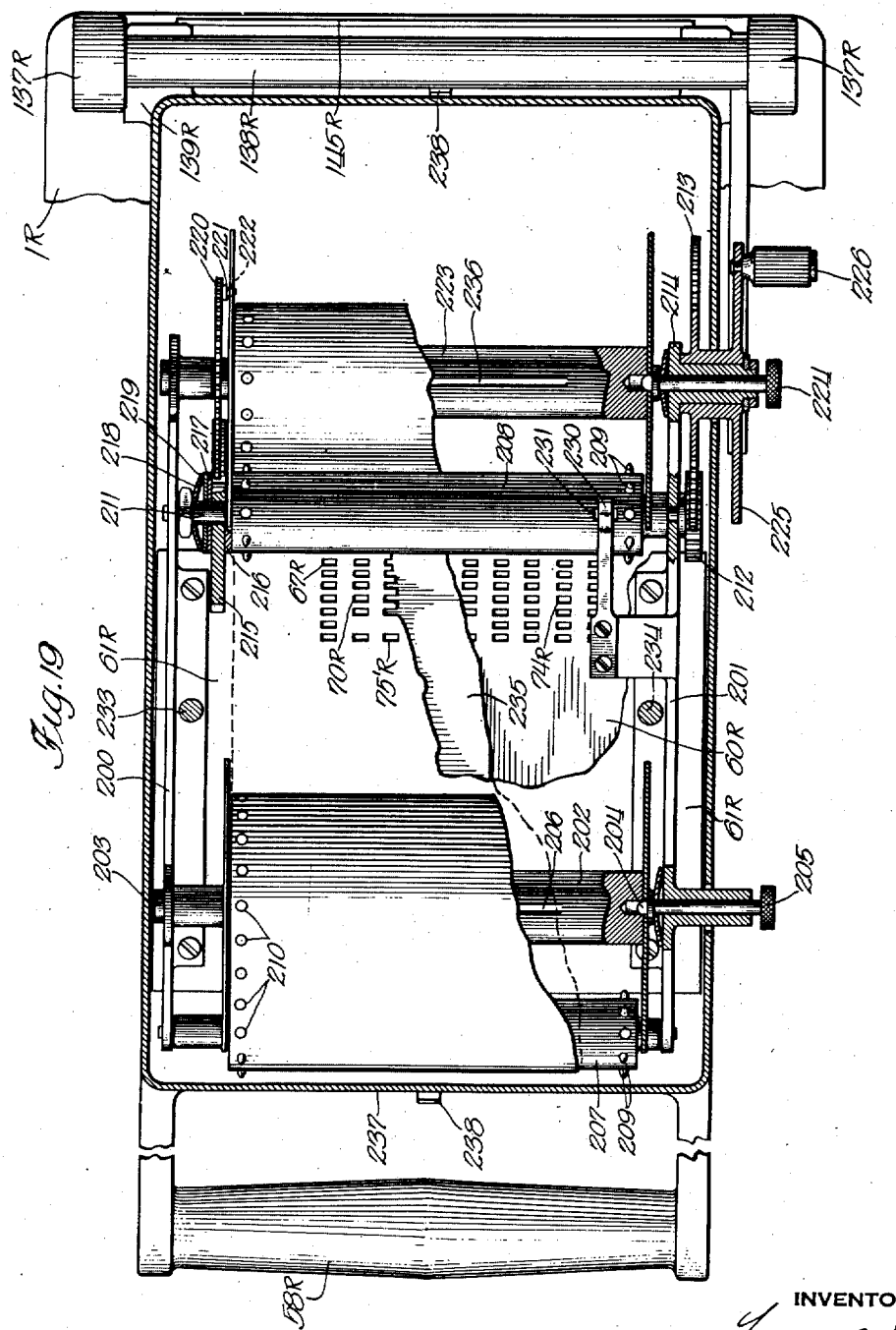

Figure 19 is a top view of a modified form, with some parts broken away, and in which the record is made on a roll of paper instead of on a card.

Figure 20:
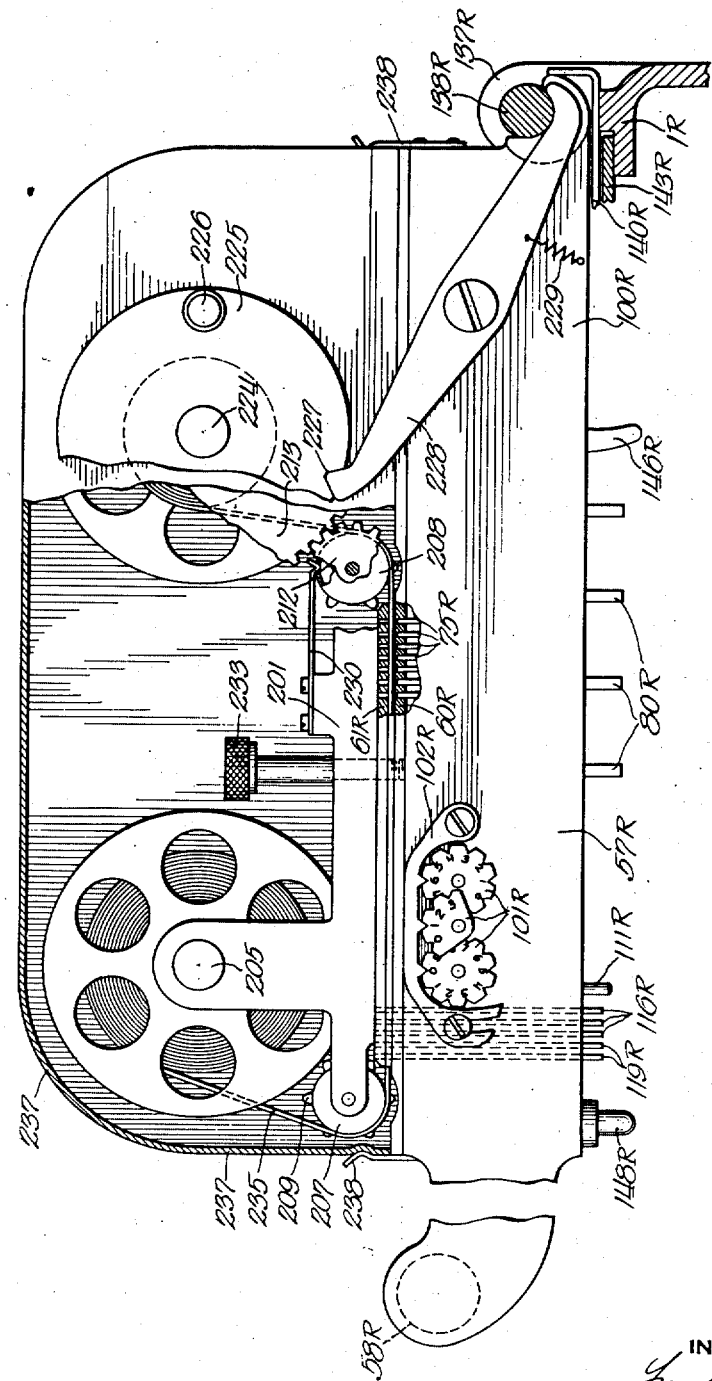

Figure 20 is a side view of the reader shown in Figure 19 with some parts broken away.

Figure 21:
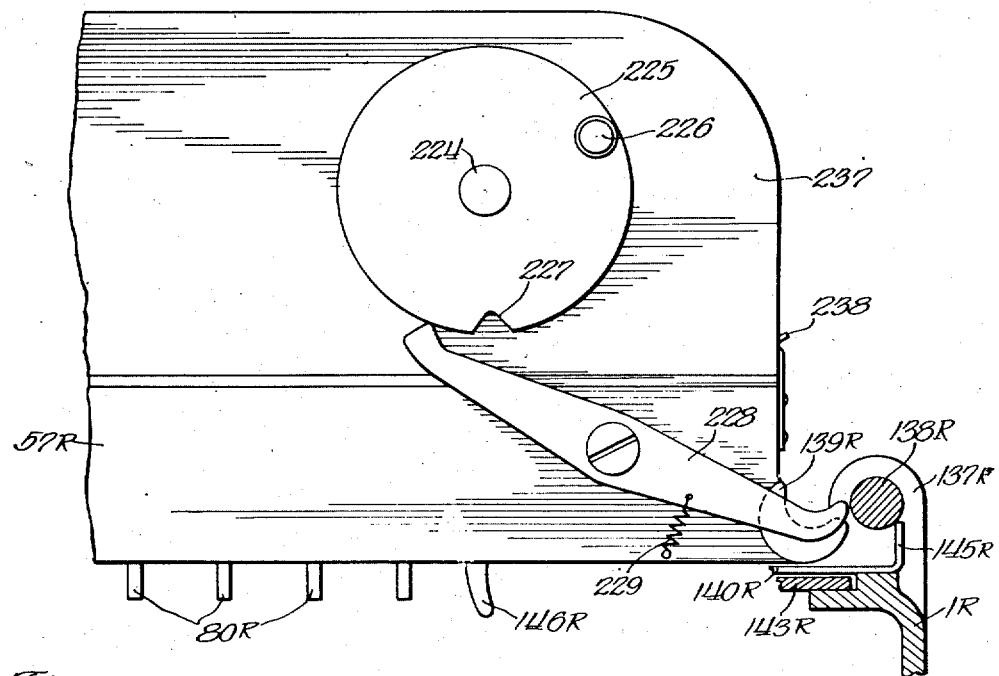

Figure 21 is a detail showing how the safety device works.

Figure 22:
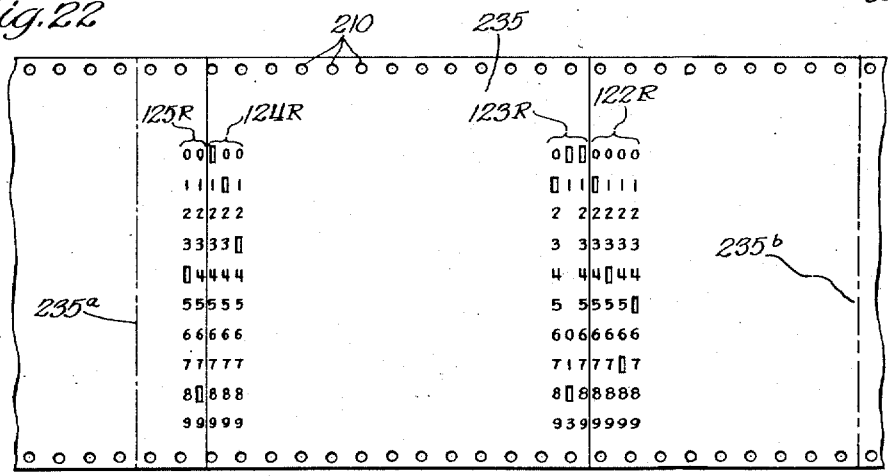

Figure 22 shows a record made by the reader shown in Figures 19 and 20.

Figure 23 shows a further modification in which the record is printed instead of perforated.

Figure 24 shows a side view, partly in section, of the reader shown in Figure 23.

Figures 25 and 25a are details of type pins.

Figure 26:
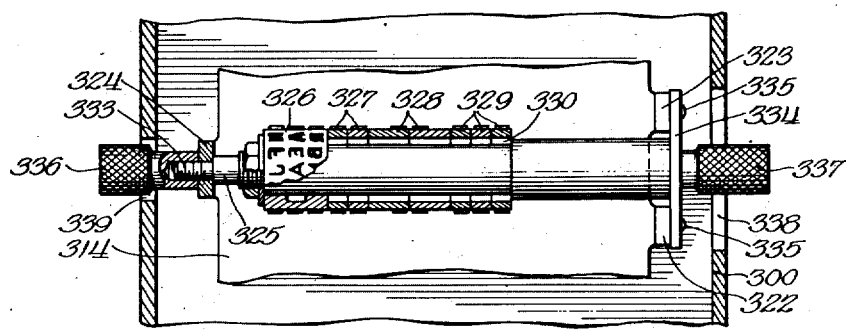

Figure 26 shows the dating wheels for the model in Figure 23.

Figure 27:
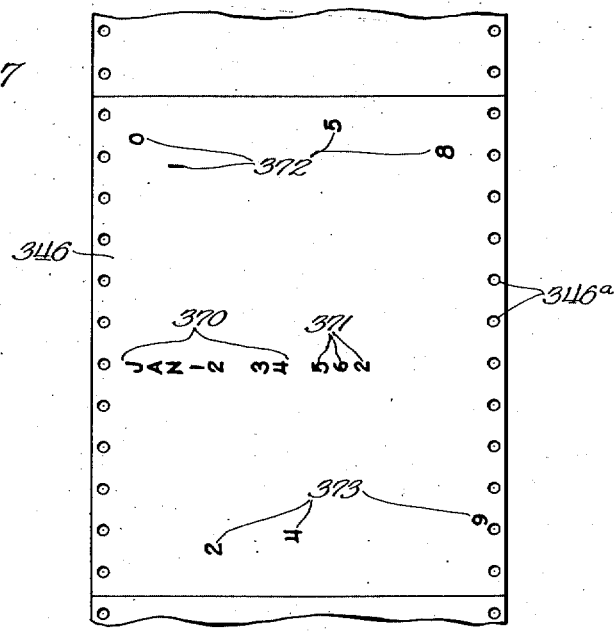

Figure 27 shows the printed record made by the reader in Figure 23.

In order to carry out the invention, it is necessary to provide a recording unit for each meter inspector. It is also necessary to provide meters having an improved form of indicating mechanism and departing somewhat in other respects from conventional meter design, in order that the recording unit and the meter may be properly associated to enable the recording unit to function under the control of the meter indicating mechanism. The recording units carry recording material in the form of cards or in continuous rolls. The inspector applies the recording unit to the meter and operates it and a record of the meter reading and other desired information is made on the record material. The inspector turns the records in to the accounting division, where they may be used merely as records for guiding the clerks in preparing the bills by manual methods; or they may be used directly to control the operation of various machines used in performing operations in preparing the bills; or they may be used indirectly for automatic operation by using them to prepare automatically the actual perforated cards, which are used for controlling the automatic machines.

The changes in the meter are identical for all the different types of recorders here described. The improved indicating mechanism will first be described as an understanding of it is necessary before the recording unit is described. The other changes in the meter will be described where they seem most easily understood.

*Index correcting mechanism*

Refer to Figure 1. 1 is the main frame of a metering device; for example gas, electric, or water. Mounted suitably in the frame 1 is an index mechanism 2. The index mechanism comprises among other parts two side plates 3 and 3a, which are suitably fastened to the frame of the meter. Pivotally mounted in the side plates 3 and 3a are four shafts 4, 5, 6, and 7 one for each index element. It will be understood that there may be any suitable number of index shafts as required by any particular type of meter, to which it may be desirable to attach the device. The shafts are suitably geared to one another in the usual decimal arrangement by a series of gears 8, 9, 10, 11, 12, 13, 14, 15, 16, 17, 18, 19, 20, and 21. Shaft 22 on which worm gear 8 is mounted may be the shaft of the meter motor or may be geared or otherwise suitably connected to the motor element of the meter, so that as the motor rotates or otherwise functions, the various shafts 4, 5, 6, and 7 will rotate and assume positions corresponding to the amount of the quantity to be measured. The shafts 4, 5, 6, and 7 are not rigidly attached to the gears 10, 14, 17, and 21 but are driven through coupling members 23 and 24. A spring 25 serves to normally urge the two members 23 and 24 in contact. The purpose of this yielding connection is to permit the operation of a correcting or increment retracting device when a reading is to be made, as will be explained in detail later. The shafts 4, 5, 6, and 7 each carry a series of ten projections 26, one corresponding to each of the integer positions 0, 1, 2, to 9 and are arranged in a helical manner around the shaft, so that each one is located in one of ten positions around the shaft, consecutive ones being separated by an angle of 36 degrees and corresponding to the usual graduations of a meter index dial, and suitably spaced longitudinally of the shaft to be in alignment with the operating parts later described.

In the metering and recording apparatus, to which the present invention relates, there are frequently employed a set of indicator shafts, such as the ones illustrated, 4 to 7, in which the indicator dials are gear driven continuously in a ratio of 1 to 10. While the units integer dial is making one complete revolution of 360°, the next adjacent dial, or tens dial, is completing a one-tenth revolution with a continuous motion and, in the same manner, while the tens integer dial is completing one revolution of 360°, the hundreds dial is completing a one-tenth revolution. As a result of this mode of operation, the several dials, at any given moment, may be found to have made but a slight fractional rotation so as to leave considerable doubt as between two integers which of them is to be construed in connection with a given reading. To a skilled observer, the reading may be calculated by ascertaining from the lower dials of the series the intended integer of its adjacent dial higher in the series.

Assume the shaft for the tens integer is approaching the No. 6 position. Until it exactly reaches the No. 6 position it should record No. 5. When nearing the exact integer position it is difficult and often even impossible to determine the correct recording position of the shaft by inspection of that shaft indicator alone. If the next lower or units shaft is in a position to cause the recorder to record any number other than 0, the tens shaft must cause the recorder to continue to record No. 5, but as soon as the units shaft attains 0, the tens shaft must cause its recorder to record No. 6 and continue to record No. 6 until the units shaft completes another revolution and again reaches the 0 position. This operation the meter inspector carries out by observing the dials from the lowest to the highest and he records one number or the next according to whether the lower dial is recorded as a zero or an integer other than zero.

To reconcile this inherent characteristic of meter reading to the use of an automatic recorder, the present invention proposes to correct the indicator elements progressively from the lowest to the highest and to correct the higher indicator to a lower number or to a higher, according to the recording position of the lower integers by an automatic test of the position of the lower indicator. To better understand the operation and utility of the aforesaid correction mechanism, a more detailed description will follow hereinafter.

Refer to Figures 3, 5, 6, and 7. Pivotally mounted on the side plate 3 is a lever 27. Lever 27 is composed of two parts 27a and 27b both pivoted at 27c. Part 27a carries a lug 27e adapted to engage the edge of part 27b and normally held in contact therewith by spring 27d. The purpose of the yielding construction will appear later. The tip 28 of lever arm 27b engages a slot in a member 30, mounted slidably by means of slots 31 on studs 32, fast in the side frame 3. Slide 30 is normally held to the left by spring 33. A series of levers 34, 35, 36, and 37 are pivotally mounted on the plate 3, (Figs. 5, 6, and 7) one corresponding to each index shaft, and tending to rotate in a counterclockwise direction under tension of springs 34a to 37a. Correcting wheels 38, 39, 40, and 41 are mounted rigidly and respectively on the shafts 4, 5, 6, and 7. Each cam has ten teeth one corresponding to each of the integer positions of the shaft. Lever 34 carries an arm 42 adapted to engage the teeth of correcting wheel 38 under tension of spring 34a, but normally held out of engagement by arm 44 engaging a high part of slide 30. Lever 35 carries an arm 47 adapted to engage a projection 48 carried by the shaft 4 which relates to the next lower digit than that which relates to the shaft 5, which carries the correcting wheel 39. The projection 48 is so located in its angular position that when it is presented under projection 47 the index shaft 5, because of the aforedescribed gear driven relationship illustrated in Fig. 4, is in a position sufficiently near an exact integer position to not require correction. When lever 27 is operated, slide 30 moves to the right and as it moves the projection of slide 30, which normally withholds lever 34, will be withdrawn, presenting a clearance 49 so as to permit lever 34 to rotate counter-clockwise. Arm 42 will then engage correcting wheel 38 and move shaft 4 to an exact integer position, as shown in Figure 6. It is to be noted that lever 34 has no arm corresponding to arm 47 and always acts to move shaft 4 to an exact integer position. The recesses 49, 50, etc. in slide member 30 are spaced so that each is presented to its associated arm 44, 51 etc. successively and in the order indicated, thus insuring that the lower numerical digits are first corrected and in so doing serve to provide an index or determining factor by reason of the lugs 48, 52, etc. for deciding whether or not the next succeeding integer shafts should be corrected. When an index occupies any position between say 1 and 2, it must record the numeral 1. When the next lower index is in the 0 position the projection 48 is in a position to prevent the operation of the correcting or increment retracting lever, since in this position the gears are so adjusted that the proper pin 26 is in exact recording position. As the next lower index advances to digit 2, the recorder must still record the numeral 1 until the lower index has advanced again to the 0 position, so that it must be moved back to the numeral 1 position until that time.

The lugs 48, 52, etc. perform automatically the function performed by the inspector manually when he looks at a lower dial to determine whether the higher dial should be recorded as the higher or lower number. Since the shafts 4, 5, etc. may be in any angular position when the correcting operation is initiated there will be times when it is just at a point where the slightest angular change in its position would cause a different number to be recorded. This position is selected as that corresponding to the zero position of the next lower shaft so that no correction is required and by thus preventing correcting in this position this uncertainty does not exist, because in all other positions the shaft is definitely in position to be corrected. A still further need exists for such a device in that there are always variations and inaccuracies in the construction of any device made in quantities. Such devices must be made free running and consequently have a certain amount of lost motion which further increases the possibility of uncertainty. For all of these reasons the range in which errors would occur without the lugs 48, 52, etc. is increased.

When, for example, the units shaft 4 is found part way between two integers, the initial movement of slide 30 presents the cut-away portion 49 beneath arm 44 allowing lever 34 to respond to the urge of its spring 34a. The entry of the foremost end of arm 42 against the particular tooth of correcting wheel 38 moves shaft 4 so as to align squarely the particular pin 26 thereof which will present the lower of the aforesaid two integers for recording. But since lever 34 has no projecting lug 47 (shaft 4 being the lowest integer indicator) the performance of lever 34 upon shaft 4 is not qualified by a precedent condition of any other shaft and may be considered merely as a centering or aligning function as distinguished from the qualified intervention of any of the other levers such as 35, 36, etc., whose function will be termed more accurately a correction. If, of two such integers on any shaft 4, 5, etc., the lower one is 0 and the higher one is 1, the correcting of its next higher shaft, in integer value, is to be prevented, hence in such case its lugs 48, 52, etc. will intervene to disable the correcting lever 35, 36, etc., leaving said higher shaft in its normal condition. But, on the other hand, if of two such integers the lower one is 9 and the higher one is 0, the correcting or aligning function will not be prevented because under those circumstances the particular shaft will be so positioned that its lugs 48, 52, etc., will have passed beyond the path of such correcting levers 35, 36, etc., leaving them free to correct the next higher integer shaft from its position approaching an ascending digital value to its preceding one.

Finally shaft 7 is corrected in a manner similar to that already described. When slide 30 has been moved to its extreme position, all of the shafts requiring correction have been corrected and the parts are so adjusted that the correction of each shaft is complete before the correction of the shaft corresponding to the next higher digit is initiated.

It will be noted, of course, that the so-called correction is instituted solely as regards the foremost portions of the shafts 4, 5, 6 and 7 (see Fig. 1), it being understood that the springs 25 which normally tend to maintain each of said shafts in radial alignment with their driving stubs through the couplings 23 and 24, continue to urge the shafts back to their chance positions and that immediately following the so-called correction, when the slide 30 is withdrawn, the several shafts 4, 5, 6 and 7 are immediately restored to their chance positions. This is permitted when the several levers 34 to 37 are returned by the camming of their associated projections on slide 30. It will also be understood that the springs 34a etc. are powerful enough to overcome the springs 25 to effect the correction of the shafts 4 etc. and that the springs 25 return shafts 4 as soon as the recorder is removed from the meter.

It has been previously pointed out that lever 27 is composed of two parts 27a and 27b connected by a spring 27d. The purpose of this yield is to permit lever 27a to be moved after the correcting operations have taken place and to allow time for the recording operations later described, since the purpose of the corrections is to insure a correct record. It will be noted that in the final position of the correcting or increment retracting device (see Figure 7) the projections indicated 53, 54, 55, and 56, each of which may be one of the ten spirally arranged projections of its respective shafts 4, 5, 6 or 7, are all in a vertical position ready for recording. In the illustration of Fig. 7, the projections which are in the recording position only are shown for the sake of simplicity and clearness in the illustration. Of course the selected projection on any shaft will be in a longitudinal position on the shaft, depending upon the angular position of the shaft.

Perforated card recording unit

The preferred form of the invention in which the record is made on a card by means of perforations representing the meter reading, the date, number of the meter, and the number of the inspector making the record, or other information desirable for records or for control purposes will now be described.

Refer to Figures 1 and 3. The recording unit comprises among other parts a main frame 57 and is provided with a suitable handle 58, which serves as a convenient means for carrying the device from place to place and also serves as a means for applying the device to a meter and for operating it to make a record. Mounted on the bottom of the frame 57 is a plate 59 and on the top a plate 60. An additional plate 61 is placed over plate 60 and spaced therefrom by spacers 62, 63, and 63a, so that one or more cards can be placed in the space between the plates. The opening between the plates is closed on three sides and is open on the side 64 (see Figure 8) so that cards can be inserted and removed thereat.

In the rear, Fig. 1, there is a projection 65 on spacer 63a adapted to engage a notch in the cards so that the registration will be correct and uniform as will be described later.

On the inside of the frame is mounted another plate 66. The top plate 61 carries four rows of openings 67, 68, 69, and 70, each row comprising ten openings. There are also other similar openings for other purposes which will be described later. Plate 60 carries corresponding openings 71, 72, 73, and 74. Plate 66 carries a similar set of openings. Corresponding holes in all three plates are in alignment and contemplate the selective allocation of a perforation with respect to a predetermined linear field.

Each set of aligned openings carries a punch 75, arranged to slide therein. Punches 75 rest at their lower ends on the tips of a set of transfer levers 76 one individual to each punch. Each of the levers 76 has a rounded end 77 which fits in a corresponding slot 78 in a block 79 so that it can move lengthwise and be oscillated in its own plane, but is held in all other directions. Projections 80 on levers 76 fit loosely in slots 81 in plates 59, so that the locations of levers 76 are determined in a longitudinal direction by the projections 80.

A stripper or restoration plate 82 is pivoted in the frame at 83 and is normally held against stops 84 by springs 85, one on each edge of the plate 82. Plate 82 carries slots 86 through which perforating pins 75 pass. Refer to Figure 8. Pins 75 are provided with notches 87 adapted to be engaged by the edges of the slots 86, so that when plate 82 is held against stops 84 by springs 85, the pins 75 will be retracted just below the surface of plate 60. The lower ends of pins 75 are engaged by levers 76, so that when a lever 76 is moved, the corresponding pin 75 will be moved to perforate the card 89 located in the space 64. The levers 76 are divided into two sets, the first and second digits are pivoted to the right and extend to the left, and the third and fourth digits are pivoted to the left and extend to the right. The levers in each pair are offset with respect to one another and the ends of the perforating pins are so shaped that the tens digit for example clears the units digit and, when operated, the tens digit will operate only the tens perforating pin. The projections 26 on shafts 4, 5, 6, and 7 are so located on their shafts that they align with the proper set of levers 76.

Dating mechanism

The part of the mechanism for recording the date will now be described. Refer to Figures 1, 3, 9, and 11. Adjacent to the perforating pins 75 are three similar rows of pins 75¹, 75², and 75³. Assigned to indicate the date on which the reading is taken. The pins 75³ correspond to the unit digit of the day, part of the pins 75², those at the bottom in Figure 1, correspond to the tens digit of the day and the two at the top to the tens digit of the month and the row 75¹ corresponds to the units digit of the month. The tens digit of the month and the tens digit of the day have been compressed into one row to save space. It will be understood that they may have separate rows, which may be preferable or in some cases necessary, depending upon the kind of machine used later in interpreting or translating the information represented by the arrangement of perforations on the cards. A plurality of levers 91 are pivoted on a rod 92, which is mounted on lugs 93 on plate 82. The other ends 94 of levers 91 are adapted to engage projections 95 on a series of shafts 86, 87, 88, and 89 pivotally mounted in the sides of the frame 57. The shafts 87 and 89 are in alignment and their inner ends are pivoted in lugs 100, only one of which is shown in Fig. 1, fast to the top plate 82. The projections 95 are arranged in a spiral manner on the shafts 86, 87, 88, and 89 similar to the arrangement of the projections 26 on the shafts 4, 5, 6, and 7.

The shafts 86, 87, 88, and 89 each carry on their outer ends a disc 101 having notches in their edges, one corresponding to each integer position of the shaft. A detent arm 102 is pivoted to the frame on a screw 103 and a slot 104 in arm 102 fits over another screw 105 (see Figure 16). By loosening screws 103 and 105, arm 102 may be swung out of the way and the discs 101 may then be moved to a position representing the new date. On each shaft is fast an additional notched disc 107 (see Figure 2) which is engaged by a jockey 108 and serves to hold the shafts after they have been set. After the shafts have been set for a new date, arm 102 is swung into engagement with the notches in the discs 101 and reclamped by screws 103 and 105 so that the adjustment cannot be inadvertently changed. There is also provided on the opposite side an arm 109 similar to 102 for clamping the short shaft 89.

When plate 82 is in its normal or unoperated position as shown in Figure 9 the levers 91 engage a fixed stop 110 and assume such a position as to retract the pins 75¹, 75², and 75³ just below the upper surface of plate 60. When plate 82 is moved upward to the position shown in Figure 11, as will be explained later, pivot 82 and levers 91 are carried upward with respect to the frame 1 and its attached parts. The tips 94 of one of the levers 91 in each set will engage a corresponding projection 95 and the motion of that end of the lever will be arrested but the pivot 92 will continue upwardly and as a consequence the opposite end of lever 91 will carry the corresponding perforating pin 75¹, 75², and 75³ upward and make corresponding perforations. When plate 82 returns under tension of springs 85, the levers 91 will again engage stop 110 and retract the operated pins from the card. A pin 111 is fast to the plate 82 for the purpose of moving plate 82 for the above operations and in a manner to be later described.

Meter designation recording mechanism

Mounted rigidly to the front face of the meter in a suitable position is a meter designation plate 112, shown best in Figs. 3 and 14. The plate, which may be standard equipment in conformity with production methods, carries three rows of tapped holes 113, ten in each row, and arranged in suitable positions corresponding to the locations of the perforations on the record card for the meter designation. A screw 114 is placed in one hole in each row according to the number assigned to the meter. While only three rows are shown, it will be understood that usually there would be a larger number of rows so as to provide sufficient numbers for the meters to be read. In each of the plates 60, 61, and 59 there are three rows of holes such as 115, in alignment in the three plates and arranged in a manner similar to holes 67, 68, and 69. In each aligned set of holes there is placed a perforating pin 116. In plate 82 there are slots 117 through which pins 116 pass. Pins 116 have in their edges notches 118 so located that when plate 82 is in its normal or retracted position the edges of the slots 117 will engage the lower edge of the notches 118 and hold the pins just below the upper face of plate 60. When plate 82 is in its operated position, some one pin in each row will engage a screw 114 in the meter designation plate and cause the corresponding pins 116 to make appropriate holes in the record card 89. See Figure 13, in which plate 82 is in its operated position, one pin is perforating and the other pins are inoperative because there is no corresponding screw in plate 112.

Inspector's number recording mechanism

In plates 61, 60, and 59 there are two more rows of holes, 118, corresponding to the inspector's number. One pin 119 is placed in one hole in each of the rows in a position corresponding to the inspector's number. All the other sets of holes in each row are empty. (Refer to Figure 12.) Pins 119 each have in their edge a notch 120 which fits into the edge of slots 117 in plate 82. The notches 120 are just slightly wider than the thickness of plate 82, so that whenever plate 82 is moved the pins 119 follow and the pins will perforate and be retracted on every operation of plate 82.

Modifications in the meter-reading device

The improved correcting mechanism for the meter indicators has already been described. Some other modifications of the meter will now be described.

On the frame of the meter are two lugs 137, which carry a round rod 138. The frame 57 of the reader unit carries two lugs 139 shaped as shown on Figure 3. The rod 138 and the lugs 139 serve as a means for locating the reader on the meter accurately and also form a pivot for its operation. On top of the meter is suitably mounted a sliding plate 140 having openings 141, corresponding to the openings 142 in a plate 143 forming the face of the meter. When the recorder is not attached to the meter, plate 140 is held by springs 144, so that the two sets of openings are not in alignment. The plate 140 serves in this position to close the meter so that dirt cannot gain access. When the reader is in position to record, plate 140 is moved by the tips of lugs 139 engaging projection 145 on plate 140 and moving it so that the two sets of holes are in alignment and the projections 80 can have access to the meter and engage the proper lugs 53, 54, 55, and 56 to make a record. Pins 148 engage holes in the plate 143 and serve to accurately locate the reader while the perforations are being made. When the recorder is removed plate 140 under tension of springs 144 again closes the openings.

Brief description of recording operation

The complete operation of taking a record will now be briefly described. The inspector removes from the reader any card upon which a record has been made. He inserts one or more cards in the proper position in the reader according to the system of recording adopted. Grasping the handle 58 he inserts the tips of lugs 139 under rod 138 as best shown on Figure 16. The tips of lugs 139 are tapered so that they readily enter the space under the rod 138, but when fully entered form a neat pivot upon which the reader unit can be rotated. As the lugs 139 are inserted they engage the projection 145 and move slide 140 so as to permit the various projections on the reader to have access to the corresponding control members in the meter. The inspector now rotates the reader counterclockwise. First a projection 146 on the reader frame engages lever 27a and corrects the shafts 4, 5, 6, and 7, as previously described in detail. When the shafts have all been corrected, a pin 111 on plate 82 engages the face of the meter moves plate 82 on its pivot and makes all the records. The yield between levers 27a and 27b permits the extra motion required for the perforating operation, as it must take place after the correcting operation has been completed.

Mounted on the ends of each shaft 4, 5, 6, and 7 is a drum 149 having on its rim numbers 0 to 9 and so arranged that the numbers corresponding to the meter reading can be observed through openings 150 in the face of the meter.

Description of the record card

Refer to Figure 15. 89 is a record card, which has been perforated in the device above described. This card is of a well-known form used in accounting machines, such for example as the Hollerith system, but the form is capable of being changed in many ways without departing from the invention here described. The columns 122 correspond to the meter reading. Columns 125 correspond to the inspector's number. The perforations in columns 122, 123, 124, and 125 are all made in a single operation and are designated as the present reading. Columns 126, 127, 128, and 129 correspond respectively to columns 122, 123, 124, and 125 and are designated as the previous reading. The later readings are also all made in a single operation.

On the upper edge of the card are two notches 130 and 131. On the lower edge two large numbers 132 and 133 are printed on the face of the card. Refer to Figure 17. In the top plate 61 is a notch 134. Also attached to the top plate 61 is a retaining spring 135, having a portion 136 bent in a suitable manner to hold the card 64 rigidly in position. When a card is to be inserted, spring 135 is raised, and if a card is already in place, it is removed and a blank card is inserted by picking it up between the thumb and the fourth finger, with the thumb on the large number 1 at the bottom of the card. The card is then inserted so that the figure 1 is displayed in the notch 134 and the notch 131 will engage projection 65 and when spring 135 is released the card will be held firmly in position to make a so-called present record.

If, on the other hand, the card is so picked up and inserted that the figure 2 shows in the notch 134, notch 130 will engage projection 65 and the card will be in position to make the so-called previous record.

Two cards may be inserted at one time, one card in one position and the other card in the other position, and when the recorder is operated, one will receive a present record and the other a previous record. The card inserted in position 1 will already have thereon a previous record, made on a previous trip of the inspector. The other card will be a blank card, which will be the card to be used by the inspector on the next strip along with another blank card. The card with the two records is the one to be used by the accounting department. The portion of the card 89a may be divided from the main portion of the card by a suitably weakened line 89b, so that it can be readily detached after it has served its checking purpose. This part may be used for visual checking to see that both readings apply to the same meter and to check the dates of the readings. Or the part 89a may be used for automatic checking.

The blank portions of the card are for other records which are made in the accounting office by any suitable method, but as they form no part of the present invention they will not be further referred to. The cards with two records made by the inspector may be used as the actual control cards to control the accounting machines. Or the inspector may be supplied only with blank cards and all his records will represent present readings. These cards may then be used in the accounting office to prepare the actual perforated cards which are used in controlling the accounting machines. In the latter case cards without the part 89a may be used.

The card shown in Figure 15 is interpreted as follows:

| | |
|---|---|
| Present reading | 2157 |
| Date | Nov. 31 |
| Meter No | 967 |
| Inspector No | 78 |
| Previous reading | 2029 |
| Date | Sept. 29 |
| Meter No | 967 |
| Inspector No | 78 |

*Perforating roll supply recorder*

Figures 19, 20, and 21 show a modified record reader in which a roll of paper or other suitable material is used instead of separate cards for each record. The frame 100R is substantially the same as the frame 100 and the perforating mechanism mounted therein may be identically the same as that mounted in frame 100. The paper supply mechanism and only such parts as are different will be described. A few of the corresponding parts not described but shown have been given the same numbers as in the drawings for the card type, but with a letter R added. The correcting mechanism in the meters and other special features of the meters are the same as described in connection with the card type.

The plate 60R is substantially the same as plate 60. The plate 61R corresponds to plate 61 but is shorter and is supported on the sides and the space between the plates is closed on both sides and open on both ends to allow the roll paper to pass through. Plates 60R and 61R have punch openings identically the same as those in plates 60 and 61. Mounted rigidly to plate 61R are two end plates 200 and 201.

A supply reel 202 similar to those used in roll film cameras is mounted between the plates 200 and 201 on a fixed pivot 203 and a spring pressed pivot 204. Pivot 204 is provided with a knob 205, so that the reel can be readily removed and replaced in a well-known manner. The slot 206 serves to secure the end of the record material. Feed rolls 207 and 208 are revolubly mounted in the side frames 200 and 201 and carry at each end feed pins 209, which engage the margin holes 210 in the record material. Fast to shaft 211, which carries feed roll 208, is a gear 212. Gear 212 meshes with a gear 213, which is mounted for rotation on a stud 214 fast in side frame 201. On the opposite end of shaft 211 is loosely mounted a gear 215. Engaging the sides of gear 215 are friction washers 216 and 217. Spring 218 presses washer 218 inward and creates through the friction washers a friction drive between the shaft 211 and gear 215. Gear 215 meshes with a gear 220 mounted revolubly on side frame 200. Gear 220 carries a driving dog 221 adapted to engage a hole 222 in take up reel 223 and cause it to rotate therewith. A knob 224 similar to knob 203 is supplied for taking out or replacing reel 223. Fast to gear 213 is a disc 225 carrying a knob 226. The gearing is such that, if disc 225 is given exactly one revolution, feed roll 208 will move the paper the exact length of one record. When the knob 226 is given one revolution, shaft 211 tends to rotate takeup reel 223 to roll up the used record material. The gearing is such that, even at the start of a new roll, a single revolution will wind up a complete record. As the diameter of the roll increases the gear 215 will slip, so that the used record material will be neatly rewound.

Disc 225 has a notch 227 adapted to be engaged by the V-shaped end of lever 228, under the tension of spring 229. Disc 225 cannot be rotated when the reader is attached to a meter on account of the locking action of lever 228. When the recorder is detached, if disc 225 is rotated only part of a revolution, lever 228 will assume some such position as shown in Figure 21 and the recorder cannot be attached to the meter to be read, until the disc has been turned to complete an exact revolution, thus insuring that the forms are in the correct position when a record is made. An additional jockey 230 fits into a notch 231 in feed roll 208 and serves to still further insure the correct location of the forms and compensate for any lost motion in the gears or other parts.

The plates 614 and end plates 200 and 201 are rigidly fastened together and with the other parts mounted thereon form a unit, which may be removed by loosening thumbscrews 233 and 234, and so facilitate removing a completed record or inserting a new supply of record material.

The record material 235 is supplied in rolls of suitable size on spare reels similar to 202. On each margin of the record material are suitably spaced feed holes 210. A length of material suitable for a single record carries eighteen holes in each margin. One revolution of disc 225 rotates feed roll 204 three revolutions and since it has six pins, the material will be advanced the distance of one record.

When a new roll is to be inserted, thumbscrews 233 and 234 are loosened and the top unit is removed. Handle 226 is operated until all the material has been transferred to reel 223. Knob 224 is pulled out and reel 223 is removed. Knob 203 is operated, empty reel 202 is removed and inserted where reel 223 was. A new supply of material on a spare reel is now inserted where reel 202 was. The end of the material is passed over feed roll 207, across plate 61R, over feed roll 208, and the end is fastened in slot 236. Knob 226 is now turned until arm 228 enters notch 227. The unit is now replaced and the thumbscrews tightened, and the recorder is ready to make a record. A suitable cover 237 is held in place by spring clips 238 and if of course removed when the supply rolls are being replaced.

The reader is applied to the meter and operated in identically the same manner as in the case of the card type of machine. The lever 228 performs the function of preventing the attachment of the reader to a meter when the record material is not correctly located. How lever 228 blocks the attachment by engaging rod 138R will be evident by referring to Figure 21. After one record has been made the handle 226 is given one revolution to bring into position a new portion of the record material.

Roll perforated record

Refer to Figure 22. A single record occupies the space from line 235a to 235b. The present reading only is recorded by this type and the record is identical with the corresponding record as shown in Figure 15.

The record as shown is interpreted as follows:

Present reading_____ 1475
Date_____ Nov. 20
Meter No_____ 13
Inspector No_____ 48

The separating lines 235a and 235b may be printed or mechanically impressed on the paper when it is supplied. In either case, when a new roll is inserted, the feed holes 210 are so placed on the feed rolls 207 and 208 that the form is in a correct recording position when the tip of lever 228 engages notch 227. The lines 235a and 235b will also later serve to correctly locate the completed record in a reproducing machine or on an accounting machine, if of the roll type. Or the records may be separated at the impressed lines and used as individual control cards.

This type of record is well adapted to use where the actual accounting cards are made in the accounting office.

Type printing recorder

This modification makes a type printed record instead of a perforated record and on a roll of record material.

Refer to Figures 23, 24, 25, 25a, and 26. A considerable number of the parts are identical with or similar to corresponding parts on the previously described models. The device comprises a main frame 300. Mounted on the top face of frame 300 is a plate 301. Plate 301 carries a series of openings 302, arranged in four rows, each row having ten openings and arranged at a suitable spacing, which may be the same as that in the perforating model. This arrangement has been chosen for illustration to avoid duplicating the description of similar parts, although it will be understood that they may have any desired arrangement. Fitting into each of the openings 302 is a slide 303, having engraved on one end thereof type characters 303a. In this case each set has the numbers from 0 to 9. A plate 305, having corresponding openings is mounted rigidly in the frame, and provides a second bearing for the slides 303.

A series of levers 306 similar to levers 76 is provided, one for each of the slides 303. The levers 306 have a rounded end 307, which fits into slots 308 in a block 309. Levers 306 also have projections 310 like projections 80 and the levers are the same as and operate in the same manner as the levers 76 already described.

There is also provided a set of slides 311 which fit into openings 312 in plate 301, and are also arranged in rows of ten each, and are for the purpose of recording the number of the meter being read. The slides 311 also fit into similar openings in the bottom plate 313 and also have engraved on one end suitable type characters 311a. The protruding ends of the slides 311 are adapted to engage the projections on the meter designation plate as already described in connection with the perforating model.

A plate 314 is mounted on pivots 315 in the frame 300. Plate 314 is normally held against stops 316 by springs 317. Plate 314 carries slots 318 through which slides 303 pass and the edges of the slots engage the edges of notches 319 in slides 303 and so hold the slides away from the recording position. Slides 311 likewise pass through similar openings 320 in plate 314 and the edges of the openings likewise engage the shoulders of notches 321 in slides 311 and so normally hold the slides out of recording position.

Lugs 322, 323, and 324 are formed on plate 314 and serve to hold a unit, comprising a series of typewheels which record the date and number of the reader or inspector, and best shown in Figure 26. The dating unit comprises a shaft 325, upon which are mounted month wheel 326, day of month wheels 327, year wheels 328, and inspector designation wheels 329. Each of the typewheels is rotatably mounted on shaft 325 and each carries a series of notches 330, one for each designation on the wheel, twelve for the month wheel and ten for each of the others. Steel balls 331 are mounted in holes in the shaft 325 and are pressed outward by springs 332. There is one ball and one spring for each wheel, and they are arranged to engage the notches in the wheels in such a manner as to hold them in the correct recording positions. The shaft 325 has a threaded portion 333 at one end and a plate 334 at the other end. Plate 334 has two holes adapted to engage locating pins 335. The threaded portion 333 passes through a hole in lug 324 and a thumb-screw 336 serves to clamp the date wheel unit securely to plate 314 so that it will move with it, as explained later. Fast to plate 334 is a knob 337. In the frame 300 is an opening 338 of such a size as to permit plate 334 and the ent're dating unit to pass through it. In the opposite side of the frame is another opening 339, through which thumbscrew 336 passes. By loosening thumbscrew 336 and grasping knob 337, the date wheel unit may be removed from the reader and the various wheels set to the proper date and designation and replaced. When the dating unit is in place, the type set for recording are opposite an opening 337a in plate 301, so that they can protrude above the surface of the plate and make an impression as later described.

Over plate 301 is mounted a removable paper supply unit, similar to the one described for the roll type of perforator. This unit comprises a main plate 340, to the under side of which is attached a plate 341 of suitable material to serve as a printing platen, such as hard rubber. On the upper side of plate 340 are attached two end plates 342 and 342a. At the ends of plates 342 and 342a are mounted two feed rolls 343 and 344 on suitable pivots for rotation therein. Feed wheels 343 and 344 carry feed pins 45, which fit into corresponding feed holes in the margin of the recording material 346. Mounted on plate 342 and 342a is a supply reel 202P. This reel is identical with reel 202 already described in connection with the roll perforator, and need not be further described here. It is mounted and operated in the same manner. Corresponding parts in this roll supply unit have been given the same numbers with a letter P following, and where parts are so designated it will be understood that they operate in the same manner as the original parts. There is also mounted in plates 342 and 342a a takeup reel 204P and geared to feed roll 344 the same as reel 204. The disc 225P differs from disc 225 by having two notches 227P, since in this case only half the length of record material is used for a single record, and the disc 225P is turned only 180 degrees between successive recording operations. The paper supply unit is attached to the plate 301 by thumbscrews 347 and is spaced from the plate 301 by separators 348 so that there is a space left for the record material and ink ribbon to pass.

On plate 301 are mounted two brackets 349 and 350, one at each end, in which are mounted ink ribbon spools 351 and 352 by means of suitable pivots 353, so that the spools can be readily removed and replaced. An ink ribbon 354, sufficiently wide to cover all the type carrying elements is provided. The ribbon passes from one spool to the other between plate 301 and the record receiving material 346. A ratchet wheel 355 is arranged to rotate with spool 352. Pivoted at 356 in a bracket 357, fast to plate 301, is a lever 359, which carries a feed pawl 360 adapted to engage ratchet wheel 355. A spring 361 holds pawl 360 into engagement with ratchet wheel 355 and also holds extension 362 on lever 359 in contact with cam 363, which rotates with disc 225P. As disc 225P is rotated to feed the record material, cam 363 operates pawl 360 to slowly feed the ink ribbon from one spool to the other. When the ribbon has all been transferred to the spool 352, it may be returned to spool 351 by turning knob 364. Mounted in brackets 349 and 350 are two guide rolls 365 and 366, which serve to keep the ribbon close to plate 301.

A suitable cover 368 is provided and is held in place by spring clips 369, so that it can be readily removed to replace the recording material or renew the ink ribbon.

The operation of this model is substantially the same as that of the card perforating model and needs only a brief description. Each inspector is provided with one of the readers, which has been supplied with recording material and an ink ribbon, and in which the dating unit has been adjusted to the proper date and designation. The inspector grasps handle 68P and applies the reader to the meter by causing lugs 139P to engage rod 138P on the meter. The reader is then rotated toward the meter face, projection 146 first engages the correcting mechanism in the meter and sets the indexes to exact integer positions, the projections 311 next engage the corresponding control elements in the meter and the selected slides are moved toward the platen and make the proper impressions for the meter reading and meter number.

At the same time that the above recording operations are taking place, pin 111P engages the face of the meter and plate 314 is rotated toward the platen and carries with it the date wheels which protrude through the opening 337a and make the date and reader number impressions. The motion of plate 314 also frees the slides 303 and 311 for the printing operation by receding from the holding edge of the notches 319 and 321. When the recorder is detached from the meter, plate 314 returns to normal and retracts the slides 303 and 311 and the date wheel unit. Before another record is made, the inspector gives handle 226P a half revolution and brings into position a fresh supply of recording material and also advances the ink ribbon. Lever 228P serves to prevent the record material from being displaced while a record is being made and also prevents the reader being attached to a meter when the record material is not in correct position.

Figure 27 shows a record made by the printing reader. The characters 373 denote the meter number, the characters 370 give the date, the characters 371 give the reader or inspector designation, and the numbers 372 are the meter reading. The record is read as follows: Jan 12 34 Inspector Number 562, Meter Number 249, Reading 1805. This record may be used directly for manual billing or it may be used for preparing perforated cards manually for automatic billing.

While the invention has been described as applied to integrating meters, it may be applied to other kinds of devices from which it is desired to make a record of their condition. And while the record has been chosen of a form suitable for controlling a particular type of statistical and accounting machines, it may be made in other forms suitable for operating other types of machines and for other purposes than accounting. It is evident that both the form of the record and the apparatus for making the record may depart materially from the specific ones shown without departing from the spirit or scope of the invention.

What is claimed is:

1. In a recording system, a recording unit, a record controlling unit, a correcting device included in the record controlling unit, means to attach the recording unit to the record controlling unit, and means carried by the recording unit to operate the correcting device when the two units are associated.

2. In a metering device, a series of geared indicating elements, each element corresponding to a digit of a number to be indicated, means associated with one digit element to correct the setting of said element to an integer setting, and means to determine the operation of said correcting means by the next lower digit element.

3. In combination, a recording device including means to carry record receiving material on one side of said device, a plurality of operating members projecting from the opposite side, each operating member corresponding to a single character to be recorded, and means external to the recording device to select and operate said members comprising a control unit having peg wheels selectively positionable, and pivot means for supporting said device rotatively to promote the registration of said operating members with said peg wheels.

4. In a system of meter reading, a meter having coupling fixtures comprised of pivot-supporting members for affording connection and alignment, a portable device having co-operating fixtures for engaging said first mentioned fixtures and for thereby promoting the alignment of said device with said meter, and record communicating elements associated with said meter to co-operate sequentially with recording members associated with said portable device during the pivotal cooperation of said fixtures.

5. In a system for recording metering information, a meter capable of presenting variable index readings, a recording device, means for detachably associating said recording device with said meter comprising pivotal coupling fixtures and aligning fixtures, and means to communicate the information from said meter to said recording device during the act of attachment.

6. In a recording system, a meter having a plurality of metering elements arranged progressively, a recorder having a plurality of sensing elements arranged in a series in accordance with the progression of said metering elements, means to associate said recorder with said meter, and means operative during the act of association to communicate the setting of each of said metering elements to its associated sensing elements successively.

7. In a recording system, a record controlling unit, a recording unit including a plurality of recording elements, a plate in said recording unit for normally holding said elements in a non-effective position, means to articulate said recording unit and said record controlling unit, and means operative in response to said articulation for disabling said plate and for thereby permitting the performance of said elements.

8. In a system for perforating a record comprised of numerical designations projected upon a linear field, a plurality of indicating devices having circumferentially presented numerical index elements, a set of punch control members presented in an alignment corresponding to said field adjacent said index elements, means for detachably associating said punch control members and said circumferential index elements and means for communicating the setting of said circumferential index elements through said punch control members to install a corresponding perforation in the linear field during the act of association of said detachable means.

9. A meter-reading device comprising means to support a record bearing material, pivotal coupling means for detachably associating said device with a meter, means for sensing successively the integer designations of said meter during the pivotal coupling operation coincident with the application of said device to a meter, and means to make perforations in said material during said coupling operation.

10. In a recording apparatus, a plurality of columns of integer members, each column corresponding to a decimal position of a numerical series and each member in a column corresponding to an integer in a numerical series, actuating means for advancing each member in a column, control means for positioning said actuating means in accordance with a numerical setting, and means for imparting a cumulative increment correction to said control means.

11. In a record perforating system, a perforating unit including a plurality of aligned protruding elements, a meter apparatus having a plurality of openings corresponding in alignment to said protruding elements, a cover plate slidable into position for covering said openings, coupling means for connecting said perforating unit and said meter apparatus, and means responsive to a coupling operation for withdrawing said cover plate to expose said openings to said protruding elements.

12. In a perforating mechanism, a control device comprising a set of positionable shafts having predeterminedly distributed pegs radiating therefrom, a punch block unit having pivotal coupling engagement with said control device, a plurality of rows of punches grouped in alignment off-set with respect to said shafts, and means for communicating a setting from said shafts to said punches comprising a plurality of inter-position members supported for longitudinal movement and for transverse reciprocation.

13. In a recording apparatus, an arbor for carrying a supply of record receiving material, means to feed out predetermined quantities of said material, and conditioning means associated with said arbor for preventing the operation of said recording apparatus during the movement of said arbor and between predetermined positions.

14. A meter-reading device comprising means to support a record-receiving material, an alignment of perforators for making perforations in said material, coupling means for detachably associating said device with a meter, and means responsive to a coupling operation for selectively actuating said perforators.

15. In combination with a device having integer indicators geared together so as to impart proportional increment rotation to the indicators of a higher decimal representation under the actuation of indicators having a lower decimal representation in a numerical sequence, a transfer setting mechanism and correcting means comprising elements individually associative with said indicators and operative to move said indicators in a return direction for effecting a decremental movement, and means for moving said elements into engagement with their respective indicators progressively and in accordance with their ascending decimal value.

16. In an indicating apparatus, a series of index shafts, gear and pinion means connecting said shafts sequentially, said gears and pinions having a diametric ratio commensurate with a decimal value ratio assigned to each of said indicator shafts, each of said shafts having regularly spaced circumferential integer values, and means for imparting a cumulative correction to each of said shafts under the control of its adjacent shaft next lower in decimal value comprising jockey elements and spaced projections associated with each of said shafts.

17. In combination, a printing device comprising a plurality of sets of type carrying members, each set comprising a printing member corresponding to each of the ten numerals 0 to 9, a counting device comprising a counting member for each digit of a number to be printed, coupling and aligning means carried by each device, and means effective when the two devices are associated through the coupling and aligning means to select and operate each printing member according to the position of its corresponding counting member.

18. In a recording system, a recording unit, means to associate said recording unit with a control unit, means to condition said recording unit for a subsequent record after each record has been made, and means to prevent the taking of a subsequent record until said conditioning means has been operated.

19. In a system of meter reading, a recorder comprising a plurality of character sensing elements, coupling means for connecting said recorder with a metering device, a plurality of index elements in said recorder, and means for actuating said index elements successively during the coupling engagement of said recorder with said metering device.

20. In a recording system in which decimal integer indicating elements in a series are yieldably movable incrementally and relatively to their adjacent elements lower in decimal order, the method of attaining a reading of each element without its incremental accumulation which comprises the procedure of first selecting the lowermost digital value from the lowest element of the series, then choosing under the supervision of said first selection the corresponding digital value of the next higher element in the series and moving said element in the direction of its yield until it attains a previous exact integer value, repeating the last described selection with respect to each higher element under the control of its adjacent lower element until the series is traversed, transferring a reading to a non-incremental recorder of all of said elements in said series, and thereafter permitting all of said elements to resume their yieldably urged normal position.

21. In a system of meter reading, a meter having coupling fixtures for pivotally supporting a connection, a disengageable device having fixtures for connecting with said meter coupling fixtures for confining and guiding said meter and said device in pivotal cooperation, and motion communicating elements in said meter successively communicable with said device during the course of said pivotal cooperation.

22. In a system for recording metering information, a meter having a multiplicity of component indices, a recording device, means for detachably associating said recording device with said meter comprising coupling fixtures for promoting consecutive degrees of convergence between said device and said meter during coupling engagement, and means to communicate a setting from said component indices to said recording device consecutively during the convergent association of said meter and said device.

23. In a recording system, a plurality of rotatable recording elements, interrelated driving means between said elements in consecutive decimal ratios, indices associated with each of said elements having marks thereon at regular angular intervals, yieldable connections between each of said elements and its associated index, and means for moving said indices backwardly in consecutive succession to align previous markings thereof through a single mechanical movement.

24. In a recording system in which rotatable indicating elements in a series are movable incrementally and relatively in accordance with a consecutive order, the method of establishing a corrective alignment of each element without its incremental accumulation which comprises the steps of moving the element of the lowest order backwardly to its previous digital alignment, determining under the control of said lowest element the propriety of moving backward the second element of the digital order in the series, repeating the last described determination successively with each higher element under the control of its adjacent lower element until the series is traversed, and transferring a reading to a non-incremental recorder of all of said elements in said series in their condition of alignment.

25. In a recording system, a plurality of rotatable indicators having at spaced peripheral intervals character indices, interrelated driving means each associated with one of said indicators, yieldable connections between each driving means and its associated indicator, and individual correcting levers for moving said indicators in a backward direction only, including means for actuating each correcting lever successively until there is aligned an exact index.

26. In a recording system, a record making unit, a record receiving unit, guide means for aligning and promoting the proper operative association between said record making and record receiving units, and a device placed before said guide means responsive to an out-of-alignment condition of a record receiving material for preventing said operative association.

27. In a metering device, a series of indicating elements, one corresponding to each digit of a number, a plurality of members each associated with one of said elements for retracting fractional attainments to restore each element to an alignment for displaying exact integer setting, and means to render said retracting members effective successively in an ascending numerical order.

28. In an integer indicating device, a series of indicators arranged in a decimal order, gear means included in said device to move said indicators incrementally in a decimally progressive sequence, means to return said indicators temporarily to a preceding exact integer position, apparatus for conditioning said last mentioned means, and springs for restoring said indicators to their preceding positions.

29. In a metering apparatus, a series of geared indicating and recording elements decimally related in an ascending digital order, a plurality of devices for applying a decremental movement each associated with one of said indicating and recording elements and normally effective to return said elements to their preceding exact integer positions, and means operative by a single manual application to render said devices effective to position said elements successively.

30. In a metering apparatus, a series of geared indicating and recording elements, integer character wheels each associated with one of said elements including spring means for urging each wheel to assume the position of its associated element, a plurality of devices for applying a decremental movement to each of said wheels only for retracting said wheels to preceding exact integer positions, and means under the control of each wheel in an ascending order to determine the effectiveness of its adjacent device.

31. In a system of numerical transfer, a decimal series of integer recorders, a corresponding decimal series of integer indexes each index of which is capable of infinite variations of position, means for transferring the indications of said indexes to their corresponding ones of said recorders, and apparatus associated with said transfer means including a consecutively controlled correction device for electing definite values for ones of said indexes whose chance position is intermediate two definite values.

32. In an indicating device, a series of movable geared members, an indicator associated with each geared member, and a resilient connection between each geared member and its associated indicator to permit the geared member to remain in a position intermediate two integer positions when its associated indicator is moved.

33. In an indicating device, a series of driving members rotatable in angular increments, a rotatable indicator associated with each of said members having thereon indications disposed at regularly spaced angular intervals, selective means under the supervision of an adjacent indicator for rotating each of said indicators to an exact integer position, and resilient means connecting each driving member to its associated indicator to permit the driving member to remain at rest while the associated indicator is moved to an exact integer position.

LOUIS M. POTTS.